United States Patent [19]
Ishii

[11] Patent Number: 5,550,796
[45] Date of Patent: Aug. 27, 1996

[54] MAGNETIC HEAD AND MAGNETO-OPTICAL RECORDING APPARATUS

[75] Inventor: Kazuyoshi Ishii, Tokyo, Japan

[73] Assignee: Canon Kabushiki Kaisha, Tokyo, Japan

[21] Appl. No.: 540,803

[22] Filed: Oct. 11, 1995

[30] Foreign Application Priority Data

Oct. 13, 1994 [JP] Japan ................... 6-247714

[51] Int. Cl.$^6$ ................... G11B 11/04; G11B 13/04
[52] U.S. Cl. ................... 369/13; 360/114; 360/59
[58] Field of Search ................... 369/13, 14, 44.14; 360/114, 59, 103, 119, 66; 365/122

[56] References Cited

U.S. PATENT DOCUMENTS

| | | | |
|---|---|---|---|
| 4,796,241 | 1/1989 | Hayakawa et al. | 369/13 |
| 5,140,568 | 8/1992 | Yoda | 369/13 |
| 5,161,132 | 11/1992 | Hiramatsu | 369/13 |
| 5,202,863 | 4/1993 | Miyatake et al. | 369/13 |
| 5,243,580 | 9/1993 | Maeda | 369/13 |

FOREIGN PATENT DOCUMENTS 61-192001  8/1986  Japan .
61-239412  10/1986  Japan .

*Primary Examiner*—Ali Neyzari
*Attorney, Agent, or Firm*—Fitzpatrick, Cella, Harper & Scinto

[57] ABSTRACT

A magnetic head applies a magnetic field modulated according to an information signal to a recording medium. The magnetic head includes a core comprised of a laminate in which a plurality of magnetic layers are laminated, and a coil arranged around the core. In the core, a pole-tip face is formed perpendicular to the magnetic layers. The pole-tip face is arranged so as to be parallel to the recording medium, and the magnetic layers are arranged so as to be perpendicular to a direction of relative movement between the recording medium and the magnetic head. When W is a width of the pole-tip face in a direction perpendicular to the moving direction and L is a length of the pole-tip face in a direction parallel to the moving direction, the width W and length L satisfy the following relations:

$20\ \mu m \leq L \leq 100\ \mu m$ $L+40\ \mu m \leq W$ $L \times W \leq 25000\ \mu m^2$.

6 Claims, 10 Drawing Sheets

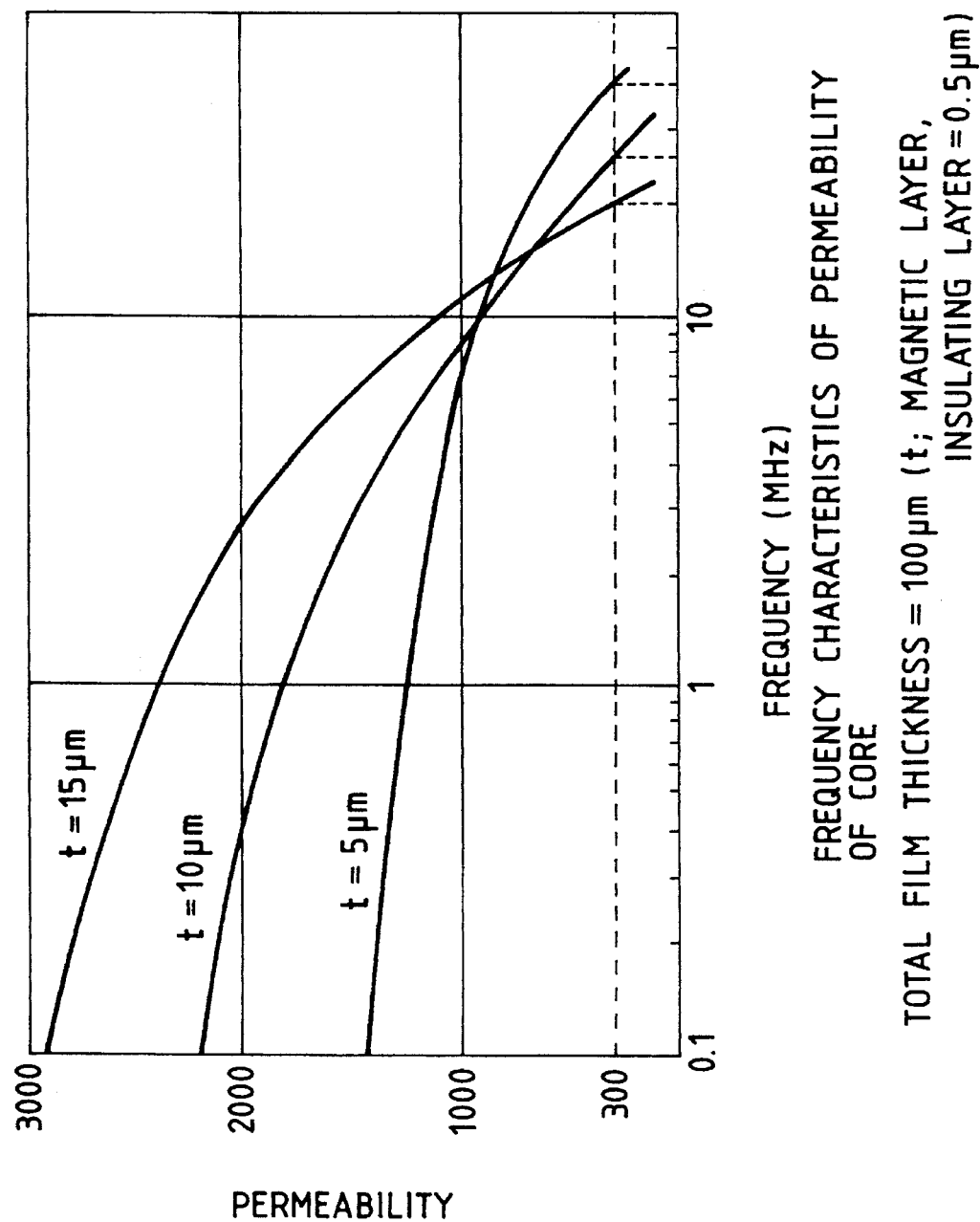

MAGNETIC HEAD AND MAGNETO-OPTICAL RECORDING APPARATUS

BACKGROUND OF THE INVENTION

1. Field of the Invention

The present invention relates to a magnetic head and a magneto-optical recording apparatus, and more particularly to a magnetic head and a magneto-optical recording apparatus for recording an information signal in a magneto-optical recording medium such as a magneto-optical disk.

2. Related Background Art

There are well known magneto-optical recording apparatus for recording an information signal in high density in a magneto-optical recording medium such as a magneto-optical disk.

FIG. 1 is a schematic structural drawing of a magneto-optical recording apparatus. In FIG. 1, reference numeral 1 designates a disk as a magneto-optical recording medium, in which a magnetic recording layer 1a is formed. The disk 1 is rotation-driven by a spindle motor 2. A magnetic head 3 is disposed on the top face side of disk 1 with an optical head 4 on the bottom face side thereof. The magnetic head 3 is held on the tip of suspension 5, and fixed ends of optical head 4 and suspension 5 are connected by an interconnecting member 6.

For recording the information signal in the magnetic recording layer 1a of disk 1 by the above magneto-optical recording apparatus, while rotating the disk 1 at high speed by the spindle motor 2, laser light 8 is projected through an objective lens 9 in the optical head 4 onto a recording track formed in a spiral form on the magnetic recording layer 1a. The laser light 8 is focused on the recording track, and focusing control and tracking control are performed with the objective lens 9 in order to keep the laser light 8 accurately following up the recording track.

At a portion illuminated by the laser light 8 on the magnetic recording layer 1a the temperature rises up to above the Curie temperature thereof. At the same time, the magnetic head 3 applies a bias magnetic field modulated according to the information signal to the portion illuminated by the laser light 8. This causes the orientation of magnetization in the temperature-rising portion of the magnetic recording layer 1a to be aligned along a direction of the bias magnetic field during a process of a decrease in temperature as the portion moves away from the portion illuminated by the laser light 8 with rotation of disk 1. In this manner the information signal is recorded on the recording track by a change of orientation of magnetization.

Next, FIGS. 2A to 2C show the construction of a magnetic head for magneto-optical recording used in such a magneto-optical recording apparatus. Here, FIG. 2A is a back view, FIG. 2B a bottom view, and FIG. 2C a side view. In the drawings, reference numeral 10 denotes a U-shaped core, which is normally made of a high-permeability ferrite. Further, numeral 11 represents a coil provided for the core 10. The magnetic head is provided with a slider 12 having an aerodynamic shape of a floating surface in order to float and run to maintain a fine gap relative to the disk by an air flow caused by high-speed rotation of the disk. Generally, the slider 12 is made of a non-magnetic ceramic material. A nearly square pole-tip face 10a is formed at one end of the core 10, and the core 10 and slider 12 are bonded to each other with the pole-tip face 10a being set on the bottom face side of the magnetic head.

In the above magnetic head, the bias magnetic field is generated approximately normal to the pole-tip face 10a therefrom when an electric current flows in the coil 11. Accordingly, the magnetic head is so arranged that the bottom face thereof is opposed to the disk and the portion illuminated by the laser light on the magnetic recording layer is located immediately below the pole-tip face 10a.

FIG. 3 is a graph to show a relationship between recording current flowing in the coil and magnetic field generated by the magnetic head in the case of the conventional magnetic head for magneto-optical recording. Here is shown an example of the conventional, standard magnetic head, in which the core is made of a ferrite the saturation magnetic flux density of which is 5 kG, in which the dimensions of the pole-tip face are 0.15 mm×0.15 mm, and in which the number of windings of the coil is 20. Here, the bias magnetic field of 200 to 300 (Oe) is normally applied in order to perform signal recording in a good condition on the magneto-optical disk. As seen from this graph, the magnetic field generated is in proportion to the recording current in the range of small recording currents, but the magnetic field generated is saturated sooner or later with an increase of recording current. This is because the magnetic flux density inside the core cannot increase over the saturation magnetic flux density of ferrite.

In addition, the magnitude of the saturation magnetic field depends upon the frequency f of a recording signal, as shown: the saturation magnetic field shows a trend to decrease with an increase of frequency f. This phenomenon results from the fact that with higher frequencies f of a recording signal a high-frequency loss (which is mainly a characteristic property of the magnetic material making the core) in the magnetic head increases so as to heat the magnetic head and with heating the saturation magnetic flux density of the ferrite making the core decreases. FIG. 4 shows an example of temperature dependence of saturation magnetic flux density Bs of the ferrite used for the core in the conventional magnetic head for magneto-optical recording. As shown, the saturation magnetic flux density Bs of ferrite is 5 kG at ordinary temperature (25° C.), but decreases with an increase of temperature, becoming about 3 kG at 100° C.

Meanwhile, the magneto-optical recording apparatus as described is recently demanded to increase the speed of signal recording, which requires an increase in frequency of the recording signal. However, as described above, the saturation magnetic field decreases because of the increase of high-frequency loss in the magnetic head with higher frequencies of recording signal. For example, as shown in FIG. 3, in a case of the frequency of the recording signal being over 10 MHz, it is impossible to obtain a magnetic field generated above 200 (Oe) necessary for satisfactory signal recording no matter how much the recording current is increased. As described, the conventional apparatus had a problem that higher-speed signal recording was impossible, because the frequency of recording signal was limited by performance of the magnetic head.

Additionally, the above magnetic head has a large inductance of a coil as 1.0 to 1.5 µH. Accordingly, in order to supply a high-frequency current to the coil, a high voltage needs to be supplied to the coil, which increases dissipation power of a drive circuit of the magnetic head. Such a restriction also keeps the frequency of recording signal from being increased above 10 MHz, raising a problem of incapability of faster signal recording.

SUMMARY OF THE INVENTION

A magnetic head of the present invention is a magnetic head comprising a core comprised of a laminate in which a plurality of magnetic layers are laminated, and having a pole-tip face formed perpendicular to the magnetic layers, a coil arranged around the core, which is arranged to relatively move with respect to a magneto-optical recording medium, wherein the above pole-tip face is arranged in parallel with the above magneto-optical recording medium, the above magnetic layers are arranged to be perpendicular to a direction of relative movement to the same magneto-optical recording medium, and the following equations are satisfied by a width W of the same pole-tip face in a direction perpendicular to the direction of relative movement to the same magneto-optical recording medium and a length L of the same pole-tip face in a direction parallel to the direction of relative movement to the same magneto-optical recording medium:

$20 \ \mu m \leq L \leq 100 \ \mu m$ $L + 40 \ \mu m \leq W$ $L \times W \leq 25000 \ \mu m^2$.

Another magnetic head of the present invention is the above magnetic head arranged to have a slider float over a surface of the above magneto-optical recording medium by an air flow caused by the relative movement to the same magneto-optical recording medium, wherein the above core is sandwiched between a front constituent member and a rear constituent member of the slider.

A magneto-optical recording apparatus of the present invention is a magneto-optical recording apparatus comprising an optical head for emitting laser light as converged onto a magneto-optical recording medium, a magnetic head for applying a magnetic field modulated according to an information signal to a portion illuminated by the laser light, and means for relatively moving said magneto-optical recording medium relative to the above optical head and magnetic head, wherein the same magnetic head is the magnetic head as described above.

In the present application, the terms "perpendicular" and "parallel" include nearly perpendicular and parallel states which can be regarded as substantially perpendicular and parallel.

The present invention makes the thickness of each magnetic layer thin by laminating a plurality of magnetic layers made of a metal magnetic material etc., thereby preventing a drop of the magnetic characteristic at high frequencies. Further, the core has the pole-tip face perpendicular to the magnetic layers, the pole-tip face is parallel to the magneto-optical recording medium, and the above magnetic layers are arranged perpendicular to the direction of relative movement to the magneto-optical recording medium, whereby an even magnetic field can be applied perpendicular to the magneto-optical medium in a magnitude enough for magneto-optical recording and whereby production is easy even if the width of the pole-tip face is taken sufficiently large. (Since an increase of the widthwise length of the laminate forces no restriction on production while an increase of the thickness of the laminate makes production steps complex, the pole-tip face can be produced in a sufficiently large width by easy production steps by arranging the magnetic layers as perpendicular to the direction of relative movement to the magneto-optical recording medium.) This can locate the light spot immediately below the pole-tip face even with occurrence of a displacement due to tracking of a light spot, whereby a sufficient magnetic field can be always applied to the magneto-optical recording medium so as to enable good signal recording.

BRIEF DESCRIPTION OF THE DRAWINGS

FIGS. 2A to 2C are structural drawings of the conventional magnetic head, wherein FIG. 2A is a back view, FIG. 2B a bottom view, and FIG. 2C a side view;

FIG. 7 is a frequency characteristic diagram of permeability of the core in the magnetic head according to the present invention;

DETAILED DESCRIPTION OF THE PREFERRED EMBODIMENTS

The embodiments of the present invention will be explained in detail with reference to the drawings. It is noted that the magneto-optical recording medium in the present invention is by no means limited to disk-shaped media, but may be, for example, one of a card shape.

Figure 1:
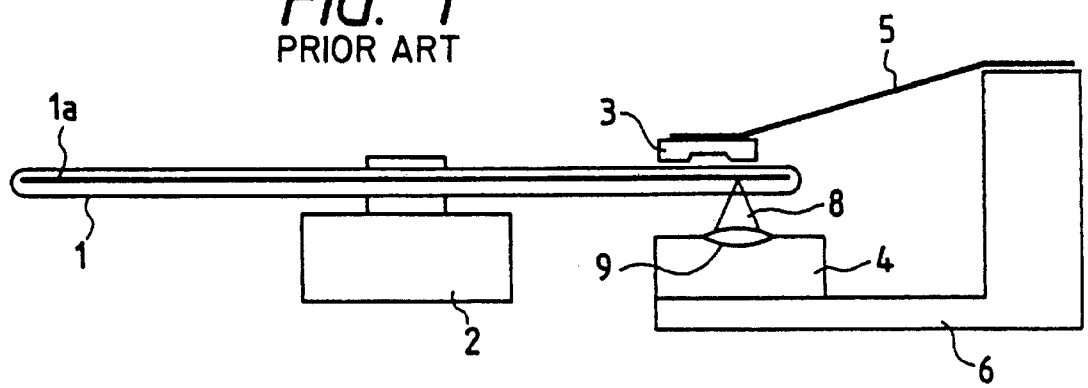
FIG. 1 is a schematic structural drawing of a magneto-optical recording apparatus.
Figure 2A:
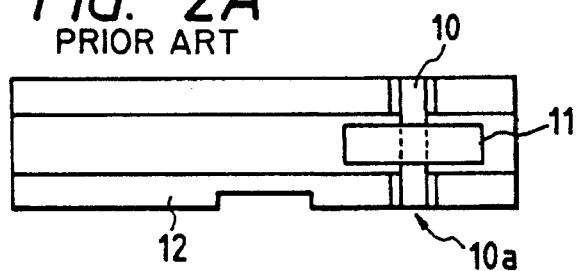
Figure 2B:
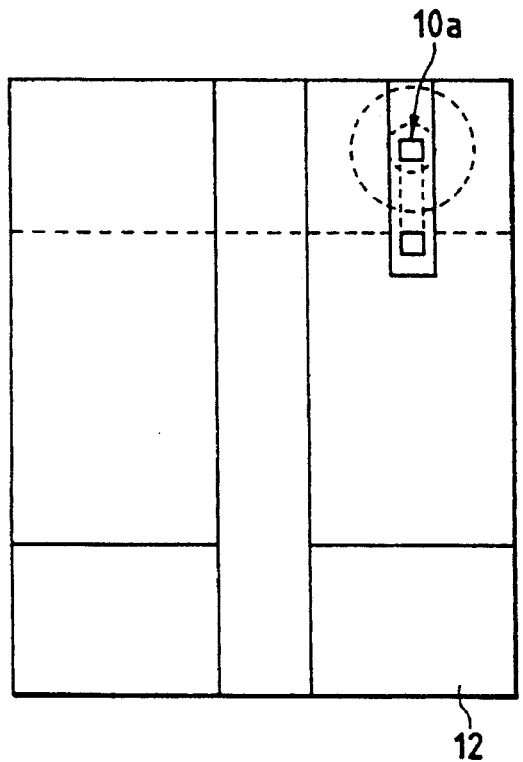
Figure 2C:
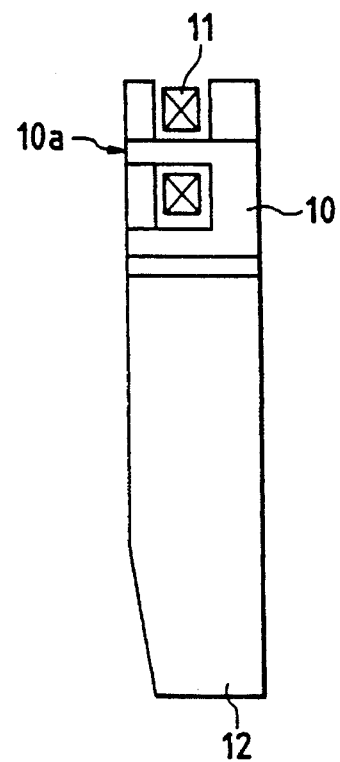
Figure 3:
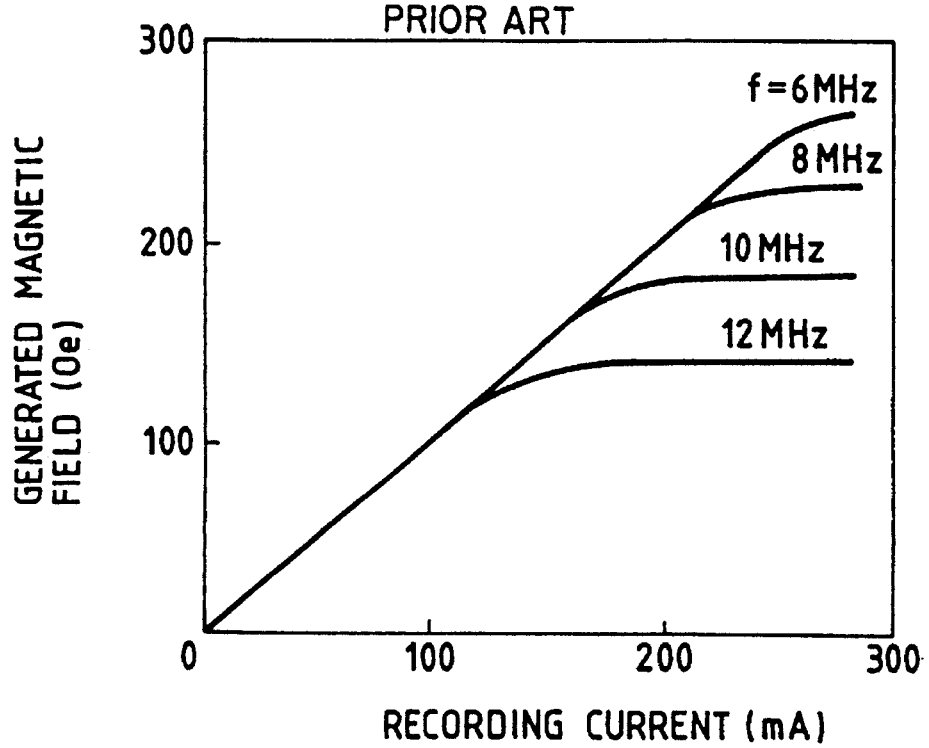
FIG. 3 is a characteristic diagram to show a relationship between recording current and magnetic field generated in the conventional magnetic head.
Figure 5A:
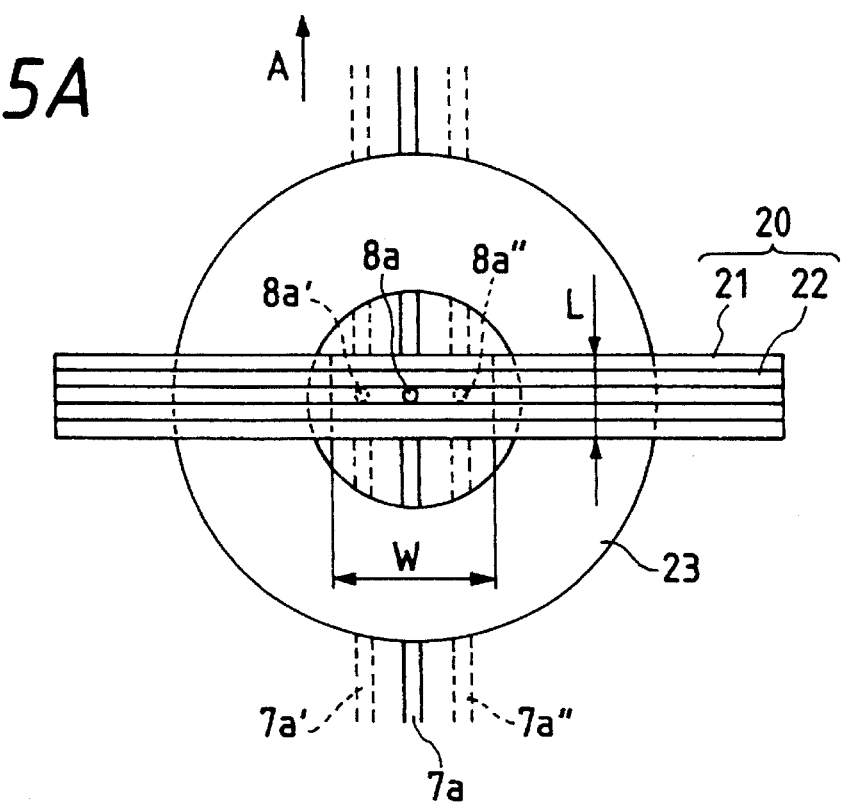
FIGS. 5A and 5B are a plan view and a front view to illustrate the magnetic head for magneto-optical recording and the magneto-optical recording apparatus in the first embodiment of the present invention.
Figure 5B:
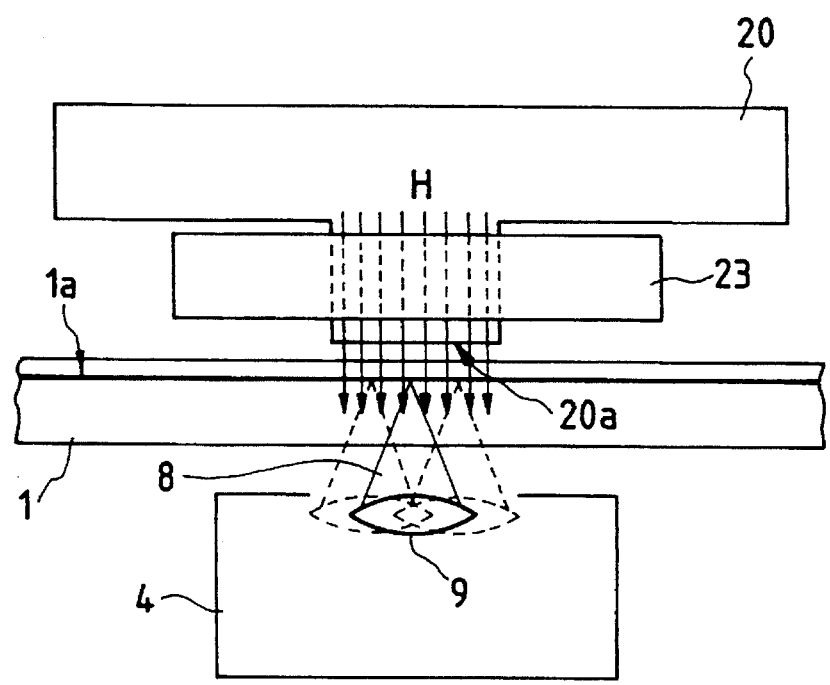
Figure 6A:
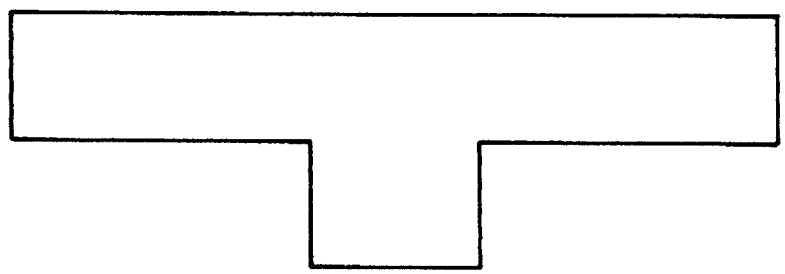
FIGS. 6A and 6B are a front view and a bottom view to show the construction of the core in the magnetic head in the first embodiment of the present invention.
Figure 6B:
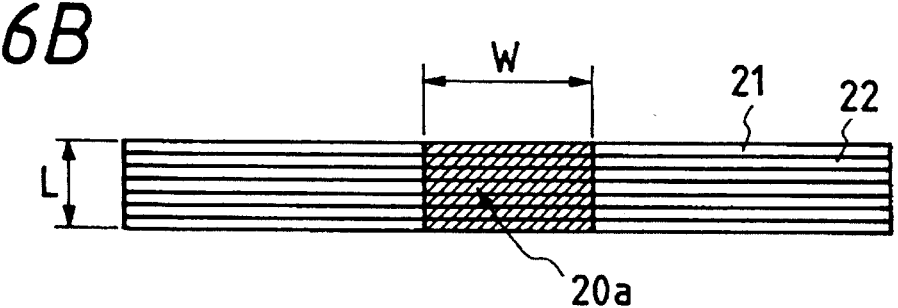

FIGS. 5A and 5B are a plan view and a front view to show an embodiment of the magnetic head for magneto-optical recording and the magneto-optical recording apparatus according to the present invention, and FIGS. 6A and 6B are a front view and a bottom view to show the construction of the magnetic core (core) of the magnetic head. Since the overall construction of the magneto-optical recording apparatus is similar to that shown in FIG. 1 as described previously, a detailed description thereof is omitted herein.

In FIGS. 5A, 5B and FIGS. 6A, 6B, reference numeral 1 designates a disk, 1a a magnetic recording layer, 4 an optical head, 8 laser light, and 9 an objective lens. Numeral 20 denotes a "T"-shaped core, which is a laminate in which magnetic layers 21 made of a metal magnetic material and insulator layers 22 are alternately laminated. The thickness of a magnetic layer 21 is not more than 15 μm, and for example, is made of a Fe-Al-Si alloy (sendust). The insulator layers 22 are provided with necessity in order to electrically insulate the magnetic layers 21 from each other and are made of a material such as $SiO_2$. As shown by hatching in FIG. 6B, the core 20 has a pole-tip face 20a formed perpendicular to the magnetic layers 21, and the core 20 is so arranged that the pole-tip face 20a is opposed in parallel to the disk 1 so as to apply an even magnetic field thereto and that the magnetic layers 22 are positioned perpendicular to the rotation direction of disk 1 as represented by the arrow A. The coil 23 is provided around the core 20. When a recording current according to an information signal is supplied to the coil 23, a magnetic field H is Generated to be applied perpendicularly to the disk 1. Here, the magnetic field H has a sufficient strength immediately below the pole-tip face 20a.

On the other hand, the optical head 4 emits the laser light 8 through the objective lens 9 to form a fine spot 8a on a recording track 7a on the disk 1. If the disk 1 has eccentricity, the recording track 7a is displaced with rotation of the disk as shown by 7a' or 7a". Against it the optical head 4 drives the objective lens 9 through an unrepresented actuator in a direction perpendicular to the recording track 7a, so as to displace the spot 8a as represented by 8a' or 8a", thus always performing tracking control to make the spot following up the recording track.

Next explained is the magnetic characteristic of the core. When a modulated magnetic field is generated by supplying a recording current of a high frequency to the coil 23, the magnetic layers 21 are preferably formed rather in a small thickness in order to prevent a drop of the magnetic characteristic due to eddy currents generated in the core 20. This will be explained referring to FIG. 7. FIG. 7 is a graph to show measurement results of frequency characteristics of permeability of the core for the respective cases where the thickness t of the magnetic layer made of sendust is 5, 10, or 15 μm. Here, the thickness of the insulator layer is 0.5 μm, and the total laminate thickness is 100 μm. As is apparent from the graph, at frequencies below about 10 MHz the permeability tends to become lower as the thickness t of the magnetic layers decrease. However, at higher frequencies than about 10 MHz, the permeability is inversely higher for smaller thicknesses t, and the frequency characteristics extend into the high-frequency region. Generally, the permeability of the core is demanded to be 300 or more in order to secure sufficient performance of the above magnetic head for magneto-optical recording. The conventional core made of ferrite had the upper limit of frequency of about 20 MHz that can secure the permeability of 300. In contrast, the present invention can achieve the performance nearly equivalent to the above-described performance when the thickness of magnetic layer t=15 μm. It was confirmed that when t=10 μm, the frequency characteristics extend to the high frequency region of about 25 MHz and that when t=5 μm, they extend to the high-frequency region of about 40 MHz.

Taking account of the point that the demand to further increase the recording frequency is becoming higher these years, the magnetic layers are preferably formed so that the thickness t thereof is at most 15 μm, preferably not more than 10 μm. Since the insulator layers are normally non-magnetic, the most magnetic flux is concentrated in the magnetic layers. Thus, supposing the saturation magnetic flux density of magnetic layers is 7 kG and the thickness of the insulating layers is x% of the thickness of the magnetic layers, an effective saturation flux density of the entire core is 7 kG×[100/(100+x)]. Then, the required thickness of the insulator layers is not more than 16% of the thickness of magnetic layers in order to exceed the saturation magnetic flux densities 4 kG to 6 kG of conventionally used ferrites.

Figure 4:
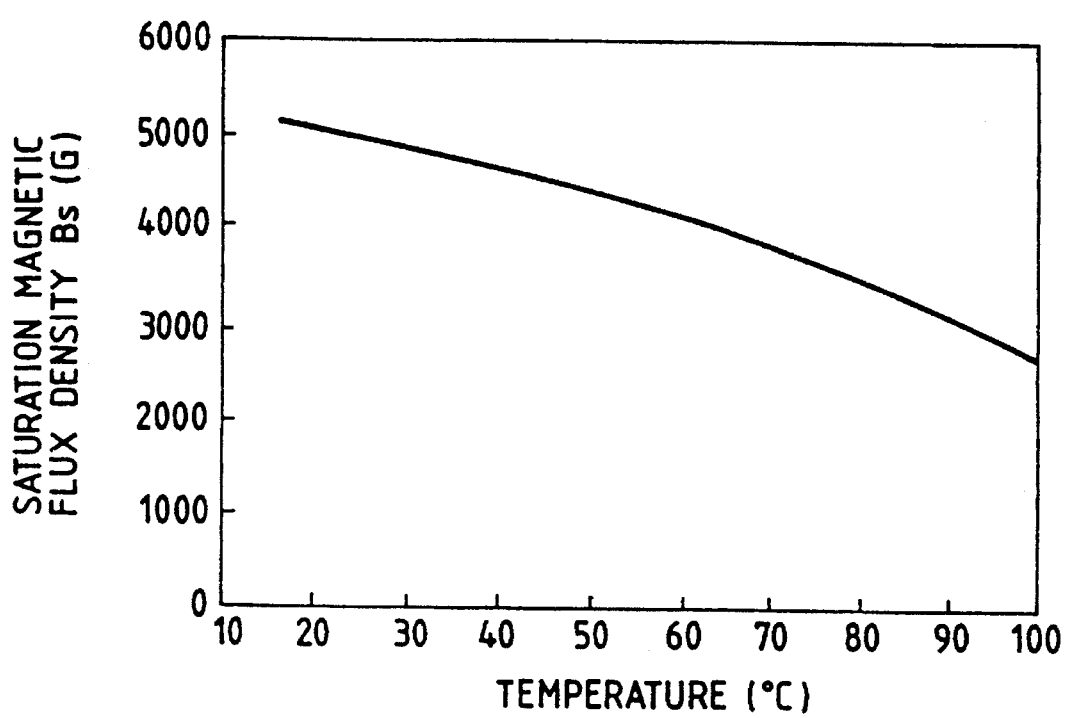
FIG. 4 is a temperature characteristic diagram of saturation magnetic flux density of the core in the conventional magnetic head.
Figure 8:
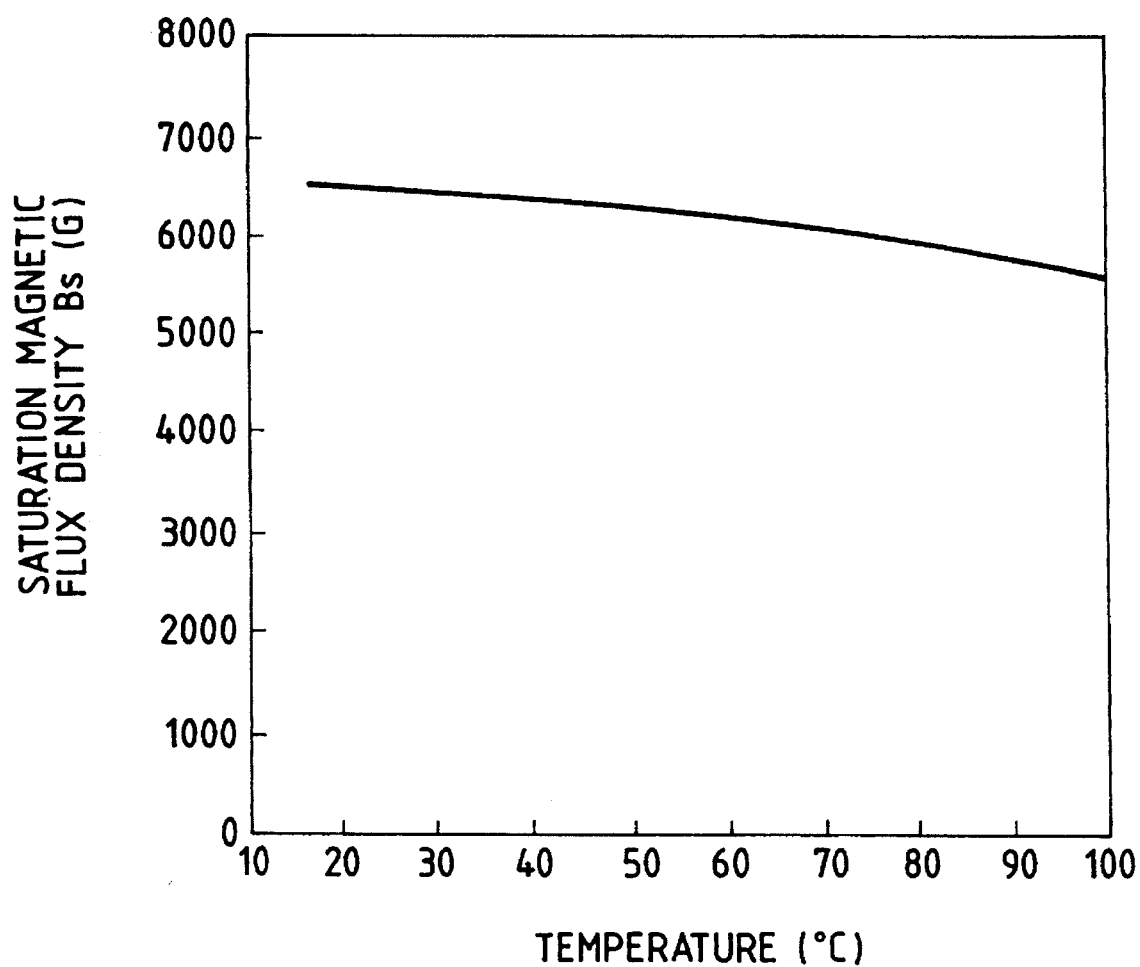
FIG. 8 is a temperature characteristic diagram of saturation magnetic flux density of the core in the magnetic head according to the present invention.

FIG. 8 shows a temperature dependence of effective saturation flux density Bs of the above-discussed core comprised of the magnetic layers of Fe-Al-Si (sendust). As illustrated, the effective saturation flux density Bs of the core in which the magnetic layers of Fe-Al-Si are laminated with the insulator layers in between is about 6.4 kG at ordinary temperature (25° C.). Although the density decreases with an increase of temperature, the decreasing rate is smaller than that of ferrite shown in FIG. 4 as discussed above: the saturation flux density Bs is as high as 5.5 kG at 100° C.

Figure 9:
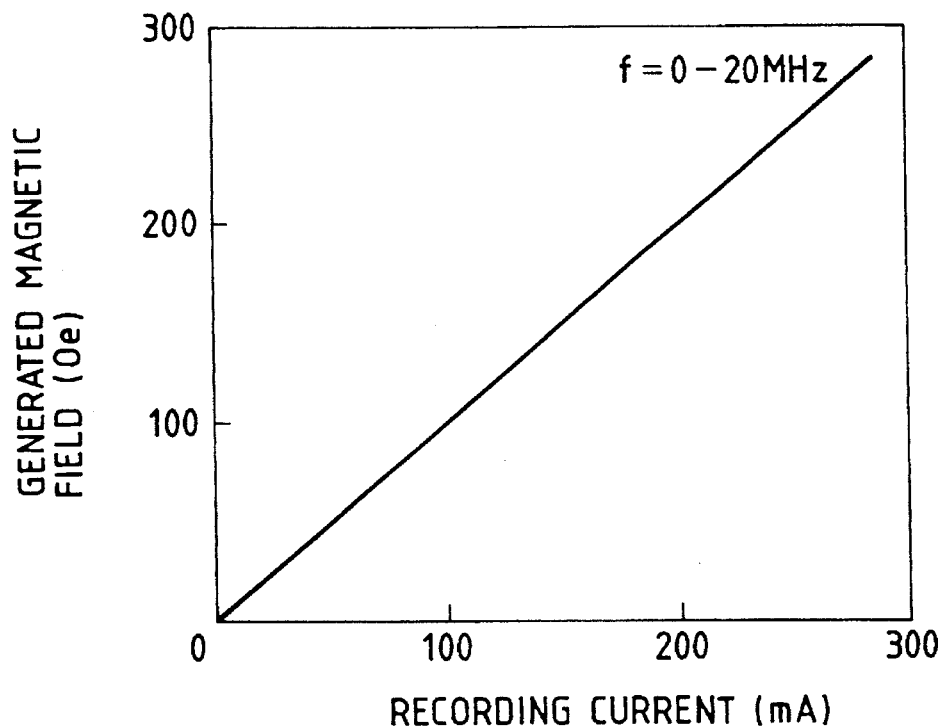
FIG. 9 is a characteristic diagram to show a relationship between recording current and magnetic field generated in the magnetic head according to the present invention.

The reason why the sendust demonstrates the different temperature dependence from the ferrite is that the Curie temperature of the Fe-Al-Si alloy is 400° to 500° C., which is higher than the Curie temperature 150° to 250° C. of ferrite. FIG. 9 shows a relationship between recording current and strength of magnetic field generated, of the magnetic head in the present embodiment. Even if the frequency of the recording signal is 10 to 20 MHz, the magnetic field generated is not saturated at or below 300 (Oe); thus, the magnetic head can obtain the magnetic field generated of above 200 (Oe) necessary for good signal recording.

Such characteristics as high saturation flux density and high Curie temperature are not specific only to Fe-Al-Si alloys (sendust), but also to magnetic materials including Fe-Ni alloys (permalloys), Fe-(M) alloys, FeNi-(M) alloys, FeCo-(M) alloys, and Co-(M) alloys (where (M) includes at least one element from Si, B, C, P, N, Al, Mo, Ti, Zr, Nb, Hf, Ta, and Y). The characteristics are common to these magnetic materials. Therefore, the core may be made of any one of these materials.

The above core can be produced in such a method that a laminate is constructed of a plurality of magnetic thin films with resin layers of insulator layers in between and the laminate is cut into a predetermined shape by an energy beam, for example a laser beam, as described in the bulletin of Japanese Laid-open Patent Application No. 61-239412. Employing such a method, production is easy and the yield is high.

Figure 10A:
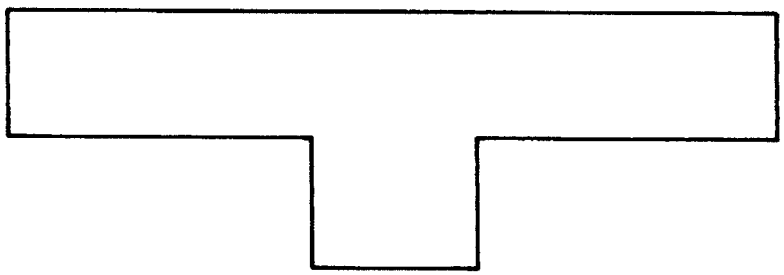
FIGS. 10A and 10B are a front view and a bottom view to show the construction of the core in the magnetic head constructed in another structure in the first embodiment of the present invention.
Figure 10B:
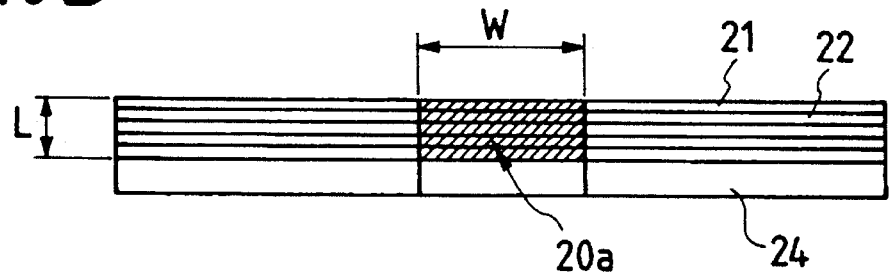

In another method, the laminate may be produced by alternately forming the magnetic layers and insulator layers on a non-magnetic substrate by a film-forming method such as sputtering and the laminate is cut into a predetermined shape. FIGS. 10A and 10B show an example of the structure of the core in the magnetic head in such an embodiment. Here, reference numeral 24 designates the non-magnetic substrate.

Next explained are the length L of the pole-tip face in the direction parallel to the rotation direction (moving direction) of the disk and the width W of the pole-tip face in the direction perpendicular to the rotation direction (moving direction) of the disk.

As described previously, because the magnetic field applied by the magnetic head is adjusted so as to keep a sufficient strength immediately below the pole-tip face 20a, the spot of laser light is to be always located immediately below the pole-tip face 20a in order to perform good signal recording even if it is displaced by tracking control. The reason why the width W of the pole-tip face 20a is aligned along the direction perpendicular to the rotation direction (moving direction) of the disk is that the tracking control is normally carried out in the direction perpendicular to the rotation direction (moving direction) of the disk.

Further, the pole-tip face 20a is desired to be as large as possible taking account of a possibility of an error of relative mount positions between the magnetic head and the optical head. Nevertheless, the inductance of coil 23 increases as the area of the pole-tip face 20a becomes larger. As is well known, a higher voltage needs to be supplied to the coil in order to supply a recording current of a high frequency to a larger inductance coil, which would raise a problem of increasing the dissipation power of the drive circuit. In addition, a variety of problems on production will arise if the thickness of the laminate is increased.

Accordingly, all these circumstances need to be taken into consideration to determine the length L of pole-tip face 20a in the direction parallel to the moving direction of the disk and the width W of pole-tip face 20a in the direction perpendicular to the moving direction of disk. According to investigations by the inventor, the width W is to be greater than the length L, and particularly, they preferably satisfy the following equations.

$$20 \ \mu m \leq L \leq 100 \ \mu m \quad (1)$$

$$L + 40 \ \mu m \leq W \quad (2)$$

$$L \times W \leq 25000 \ \mu m^2 \quad (3)$$

The reasons will be explained below. As discussed previously, the magnetic head and optical head are mounted so that the spot of laser light is located immediately below the pole-tip face of the magnetic head. Here, although an error of their relative mount positions depends upon a mounting method thereof, methods suitable for mass production could cause the position of the spot of laser light to have a maximum error of ±10 μm both in the width direction and the length direction of the pole-tip face with respect to the center thereof. Accordingly, the length L of the pole-tip face is preferably not less than 20 μm.

In addition, the above-discussed tracking control causes the spot of laser light to have a displacement in the direction perpendicular to the recording track. A maximum amount of this displacement is ±20 μm. Thus, the width W of the pole-tip face needs to be large enough for the spot not to leave the position immediately below the pole-tip face even with the displacement of the spot of laser light. On the other hand, because the spot of laser light has no displacement in the direction parallel to the recording track, the width W of the pole-tip face is preferably set greater than the length L, more preferably 40 μm as discussed above or more greater than the length.

Next, if the core of the magnetic head is produced by the above-discussed processing method of cutting the laminate by the energy beam, cutting becomes more difficult and a stronger energy beam becomes necessary as the thickness of the laminate increases.

If the intensity of the laser beam is increased too much, a temperature rise upon cutting would change the magnetic characteristics of the magnetic layers, which is not preferred. Thus, the thickness of the laminate is preferably not more than 100 μm.

If the magnetic layers and insulator layers constituting the core are formed one by one by film formation, the time necessary for the formation increases as the thickness of the laminate increases or as the number of layers increases. As an example, where the thickness of the magnetic layer is 4.5 μm, the thickness of the insulator layer is 0.5 μm, the number of layers is 20, and the thickness of the laminate is 100 μm, the formation of the laminate requires about 15 hours, which is a limit to permit mass production. If the thickness of the laminate is greater than 100 μm, a defect such as deformation of the laminate due to thermal stress etc. is likely to occur.

Also taking account of the above points, the thickness of the laminate is preferably not more than 100 μm. On the other hand, there is no such restriction on production as to the width of the laminate, and thus, the width can be determined to be sufficiently large. Further, the width W of the pole-tip face needs to be sufficiently large, as described previously, and is preferably greater than the length L. Accordingly, a desired arrangement is such that the width direction of magnetic layers is made coincident with the width direction of the pole-tip face, in other words, such that the core is arranged so that the magnetic layers are perpendicular to the rotation direction of the disk. In that case, the length L of the pole-tip face becomes equal to the thickness of the laminate.

Figure 11:
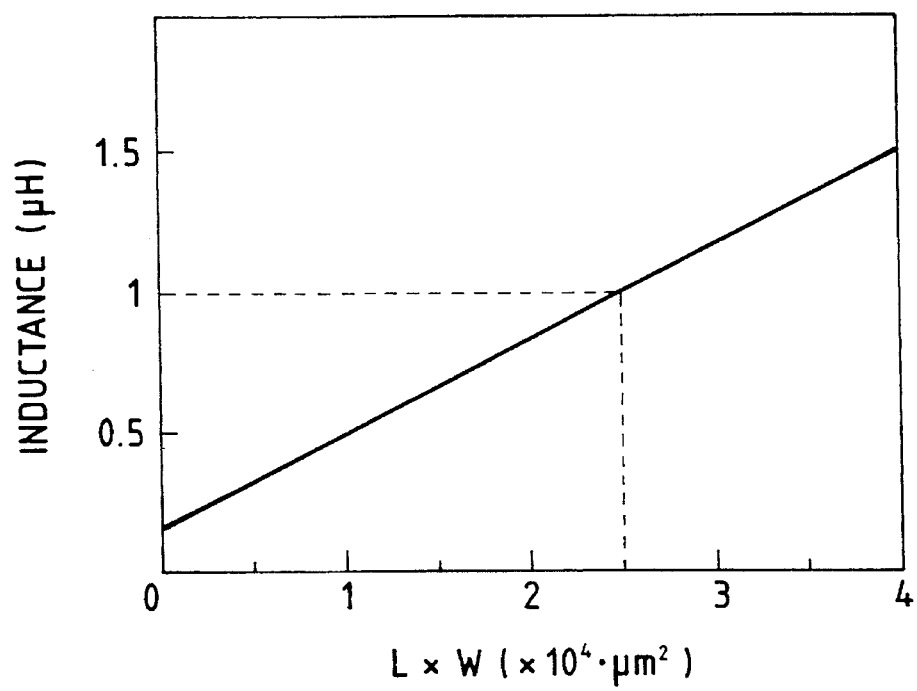
FIG. 11 is a characteristic diagram to show a relationship between area and inductance of the pole-tip face of the magnetic head according to the present invention.

Next explained is the relationship between area L×W of pole-tip face and frequency of recording signal. FIG. 11 is a graph to show an example of the relationship between area L×W of the pole-tip face and the inductance of the coil. Here is described a case in which the number of windings in the coil is 25. As shown, the inductance of the coil is proportional to the area of the pole-tip face. Normally, the inductance of the coil needs to be not more than 1 μH in order to employ the frequency of recording signal of not less than 10 MHz. If the inductance is greater than 1 μH, a higher voltage needs to be supplied to the coil in order to supply a sufficient recording current to the coil. This increases the dissipation power of the drive circuit above 2 W, which is not practical. Although there is a means for decreasing the inductance by decreasing the number of windings in the coil, a generation efficiency of the magnetic field of the magnetic head decreases in that case, which results in supplying a larger current for generating a sufficient magnetic field necessary for recording. As a result, the dissipation power of the drive circuit cannot be decreased. According to investigation by the inventor, it was confirmed that an optimum number of windings in the coil was about 25 (20 to 30). Based on these facts, the area L×W of the pole-tip face is preferably not more than 25000 μm² from FIG. 11.

Next explained is the second embodiment in which the present invention is applied to a magnetic head provided with a slider having an aerodynamic shape of its floating surface for floating-running to keep a fine gap relative to the disk by an air flow caused by high-speed rotation of the disk.

Figure 12A:
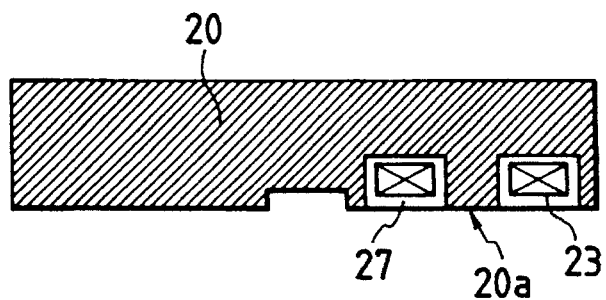
FIGS. 12A to 12C are structural drawings of the magnetic head in the second embodiment of the present invention.
Figure 12B:
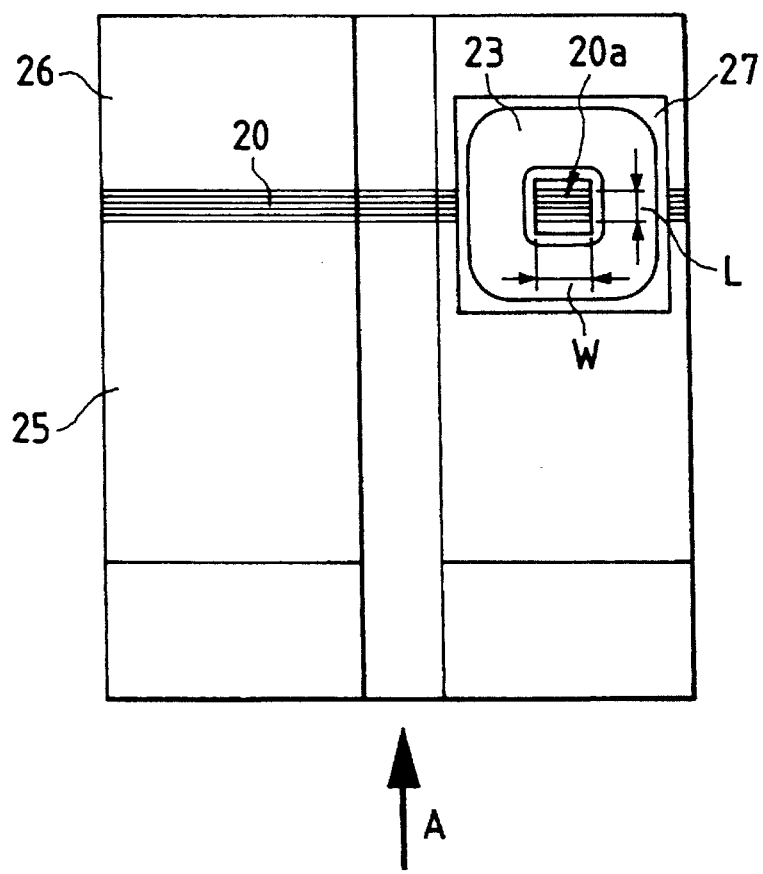
Figure 12C:
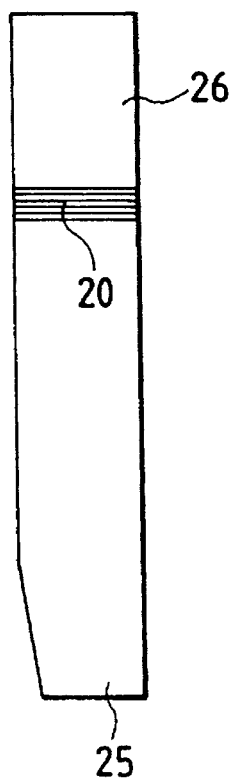

FIGS. 12A to 12C show the schematic structure of such a magnetic head. In the present embodiment, the slider is composed of a slider front constituent member 25 and a slider rear constituent member 26, which are bonded to each other with the core 20 in between. The core 20 is a laminate of magnetic layers made of a metal magnetic material etc. and insulator layers. The slider front constituent member 25 and slider rear constituent member 26 are made of a nonmagnetic ceramic material.

In the core 20 the pole-tip face 20a perpendicular to the magnetic layers is arranged so as to be opposed in parallel to the disk and the magnetic layers are arranged perpendicular to the rotation direction of the disk represented by the arrow A. The coil 23 is provided so as to surround the pole-tip face 20a of the core 20. Numeral 27 denotes a groove formed in the slider in order to house the coil 23.

In the present embodiment, similarly as in the previous embodiment, the thickness of the magnetic layer is not more than 15 µm, preferably not more than 10 µm; and the thickness of the insulator layer is not more than 16% of the thickness of the magnetic layer.

The metal magnetic material making the magnetic layers may be not only the Fe-Al-Si alloy (sendust) with high saturation magnetic flux density and high Curie temperature, but also one from Fe-Ni alloys (permalloys), Fe-(M) alloys, FeNi-(M) alloys, FeCo-(M) alloys, and Co-(M) alloys (where (M) is at least one element of Si, B, C, P, N, Al, Mo, Ti, Zr, Nb, Hf, Ta, and Y), etc.

Further, the width W of pole-tip face 20a in the direction perpendicular to the moving direction of the disk is greater than the length L thereof in the direction parallel to the moving direction of the disk, and particularly, they preferably satisfy Equations (1), (2), (3) as discussed above. An example of typical values are 200 µm for the width W and 50 µm for the length L.

In the present embodiment, the core 20 may be formed by alternately film-forming the magnetic layers and insulator layers directly on a junction surface of the slider front constituent member 25 or slider rear constituent member 26 by a film-forming method such as sputtering.

FIGS. 13A to 13C and FIGS. 14A to 14C show schematic steps of such a method for producing the magnetic head.

Figure 13A:
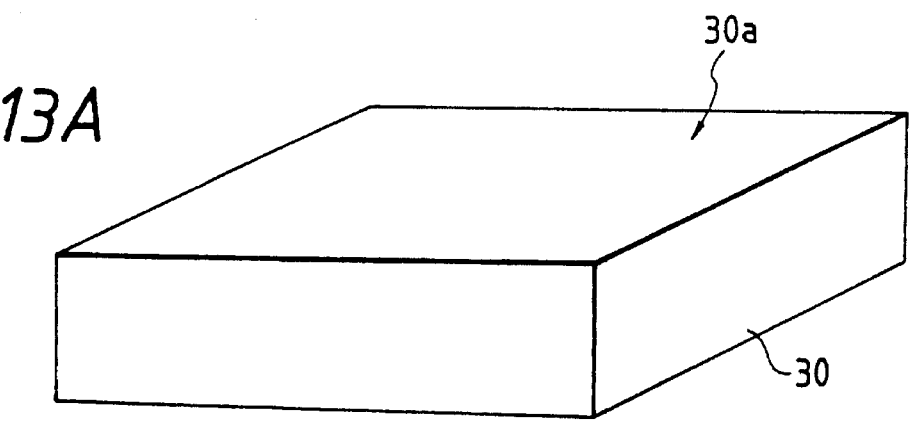
FIGS. 13A to 13C are drawings to show a method for producing the magnetic head in the second embodiment of the present invention.
Figure 13B:
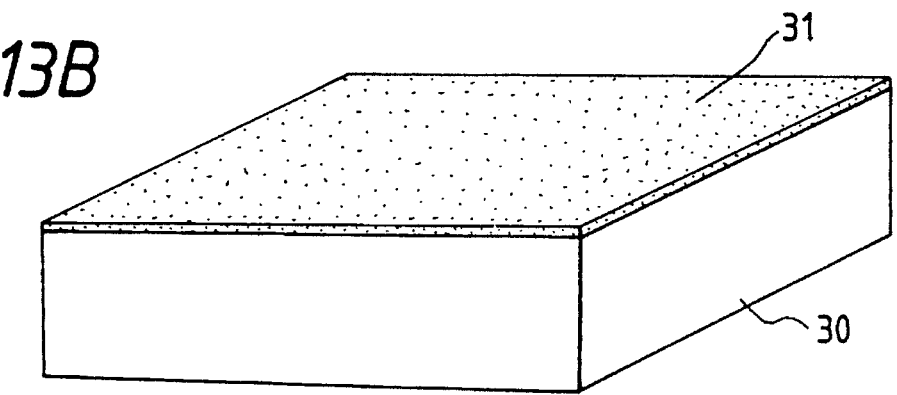
Figure 13C:
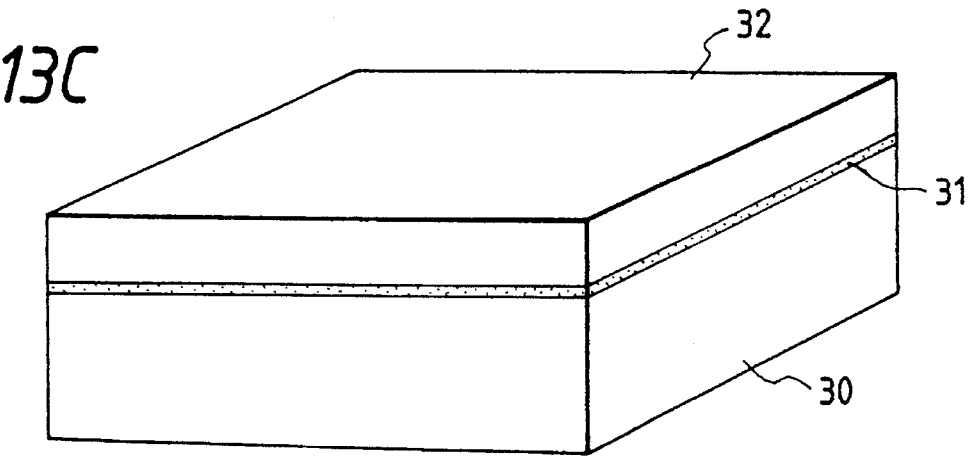

First, in FIG. 13A, mirror finishing is effected on the junction surface 30a of substrate 30 made of a ceramic material which is a base material for the slider front constituent member. Next, in FIG. 13B, a laminate 31 is formed by alternately film-forming the magnetic layers of sendust and the insulator layers of $SiO_2$ by sputtering on the junction surface of substrate 30. Supposing the thickness of the magnetic layer is 4.5 µm, the thickness of insulator layer is 0.5 µm, and the number of layers is 10, the thickness of the laminate 31 becomes 50 µm. Then, in FIG. 13C, a substrate 32 made of a ceramic material which is a base material for the slider rear constituent member is bonded onto the laminate 31 to obtain a bonded body.

Figure 14A:
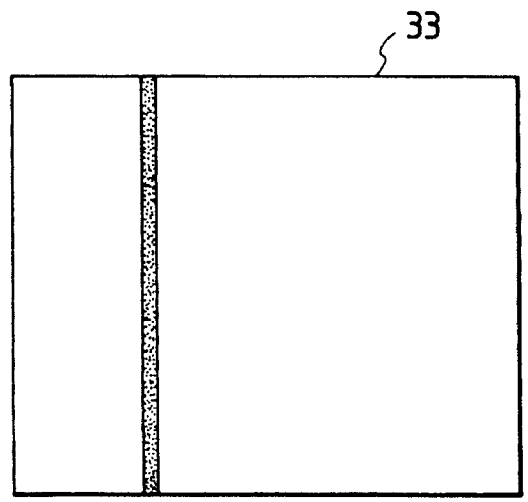
FIGS. 14A to 14C are drawings to show the method for producing the magnetic head in the second embodiment of the present invention.
Figure 14B:
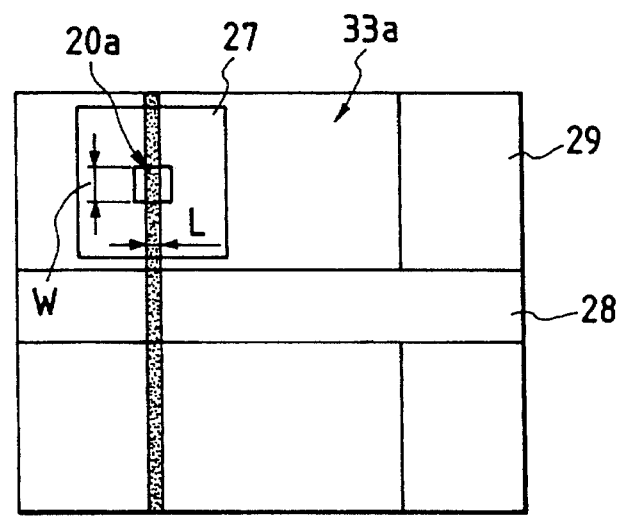
Figure 14C:
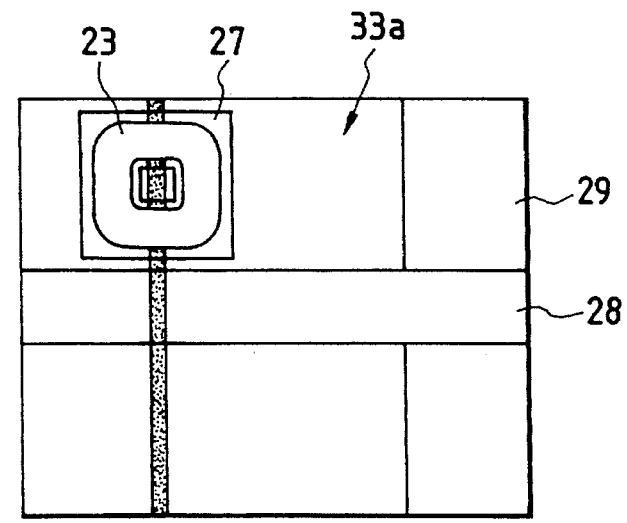

Next, in FIG. 14A, the bonded body is cut into a lot of slider bases 33. Then, in FIG. 14B, a floating surface 33a of a slider body 33 is mirror-finished and is processed to form an annular groove 27 for housing the coil, and a groove 28 and a chamfer 29 for improving floating characteristics of the slider. Here, the width W of the pole-tip face 20a is determined by the inner size of the groove 27, and the length L is equal to the thickness of the above laminate 31. In FIG. 14C, the coil 23 is housed in the groove 27, thus completing the magnetic head. This method can produce the magnetic head at extremely high efficiency.

As explained above, the magnetic head according to the present invention comprises the core comprised of the laminate in which the plurality of magnetic layers are laminated and having the pole-tip face formed perpendicular to the magnetic layers, and the coil arranged around the core, wherein the above pole-tip face is arranged parallel to the magneto-optical recording medium and the magnetic layers are arranged perpendicular to the moving direction relative to the magneto-optical recording medium, whereby the magnetic head can obtain the magnetic field generated necessary for good signal recording even with higher frequencies of recording signal. For example, even if the frequency of the recording signal is raised above 10 MHz, the magnetic field of above 200 (Oe) can be generated without being saturated. As a result, signal recording can be performed at higher speed than heretofore.

Further, if the width W of the above pole-tip face in the direction perpendicular to the moving direction of the magneto-optical recording medium is set greater than the length L thereof in the direction parallel to the moving direction of the magneto-optical recording medium, and further if the width W and length L preferably satisfy the following equations:

$$20 \text{ µm} \leq L \leq 100 \text{ µm}$$

$$L + 40 \text{ µm} \leq W$$

$$L \times W \leq 25000 \text{ µm}^2,$$

the spot of laser light is located immediately below the pole-tip face even if displacement of the spot occurs due to an error of mount positions of the magnetic head and optical head and the tracking control of the spot of laser light; thus, a sufficient magnetic field is always applied to the magneto-optical recording medium, thus enabling good signal recording.

In addition to it, mass production of magnetic head becomes possible, and such a defect as deformation of the core upon production will not occur.

Further, because the inductance of the coil in the magnetic head is not more than 1 µH, the dissipation power of the drive circuit for the coil can be controlled at a practical value below 2 W even if the frequency of recording signal is set above 10 MHz.

What is claimed is:

1. A magnetic head for applying a magnetic field modulated according to an information signal to a recording medium, comprising:

a core comprised of a laminate in which a plurality of magnetic layers are laminated, said core having a pole-tip face formed perpendicular to said magnetic layers, wherein said pole-tip face is arranged so as to be parallel to said recording medium and said magnetic layers are arranged so as to be perpendicular to a moving direction of relative movement between said recording medium and said magnetic head; and a coil arranged around said core;

wherein when W is a width of said pole-tip face in a direction perpendicular to said moving direction and L is a length of said pole-tip face in a direction parallel to said moving direction, said width W and length L satisfy the following relations:

$$20 \text{ µm} \leq L \leq 100 \text{ µm}$$

$$L + 40 \text{ µm} \leq W$$

$$L \times W \leq 25000 \text{ µm}^2.$$

2. The magnetic head according to claim 1, further comprising a slider.

3. The magnetic head according to claim 2, wherein said core is arranged between a front constituent member of said slider and a rear constituent member of said slider.

4. A magneto-optical recording apparatus comprising:

an optical head for projecting a light beam onto a magneto-optical recording medium;

a magnetic head for applying a magnetic field modulated according to an information signal to said recording medium, said magnetic head comprising a core comprised of a laminate in which a plurality of magnetic layers are laminated and having a pole-tip face formed perpendicular to said magnetic layers, and a coil arranged around said core; and moving means for relatively moving said recording medium relative to said optical head and said magnetic head;

wherein said pole-tip face is arranged so as to be parallel to said recording medium and said magnetic layers are arranged so as to be perpendicular to a moving direction of relative movement by said moving means; and wherein when W is a width of said pole-tip face in a direction perpendicular to said moving direction and L is a length of said pole-tip face in a direction parallel to said moving direction, said width W and length L satisfy the following relations:

$20 \ \mu m \leq L \leq 100 \ \mu m$ $L + 40 \ \mu m \leq W$ $L \times W \leq 25000 \ \mu m^2$.

5. The magneto-optical recording apparatus according to claim 4, further comprising a slider.

6. The magneto-optical recording apparatus according to claim 5, wherein said core is arranged between a front constituent member of said slider and a rear constituent member of said slider.

* * * * *

UNITED STATES PATENT AND TRADEMARK OFFICE
CERTIFICATE OF CORRECTION

PATENT NO. : 5,550,796
DATED : August 27, 1996
INVENTOR(S) : KAZUYOSHI ISHII

It is certified that error appears in the above-indentified patent and that said Letters Patent is hereby corrected as shown below:

COLUMN 5:

Line 16, "Generated" should read --generated--;
    Line 27, "8a"" should read --8a",--;
    line 28, "," should be deleted; and
    line 45, "decrease." should read
--decreases.--.

COLUMN 6:

Line 2, "x%" should read --x%--;
    Line 4, "(100+x)" should read --(100+x) --.

Signed and Sealed this

Eleventh Day of February, 1997

Attest:

BRUCE LEHMAN

*Attesting Officer*      *Commissioner of Patents and Trademarks*